(12) United States Patent
Raghavan et al.

(10) Patent No.: US 6,893,721 B2
(45) Date of Patent: May 17, 2005

(54) PROCESS FOR THE REDUCTION OF UNDESIRABLE OUTGASSING SPECIES

(75) Inventors: Vijaya N. V. Raghavan, Los Altos, CA (US); Mark Timothy Sullivan, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 166 days.

(21) Appl. No.: 10/241,701

(22) Filed: Sep. 10, 2002

(65) Prior Publication Data

US 2004/0046008 A1 Mar. 11, 2004

(51) Int. Cl.[7] .......................... B32B 27/38; B32B 17/06; C09K 19/00; G02F 1/1339; H04B 10/12
(52) U.S. Cl. ....................... 428/414; 428/1.5; 428/1.52; 428/1.53; 428/413; 428/415; 428/417; 428/447; 428/448; 349/153; 359/337.22
(58) Field of Search ................... 428/1.5, 1.52, 428/1.53, 413, 414, 415, 417, 447, 448; 349/153; 359/337.22

(56) References Cited

U.S. PATENT DOCUMENTS 4,950,344 A * 8/1990 Glover et al. ................ 156/109
6,204,906 B1 * 3/2001 Tannas, Jr. .................. 349/153

* cited by examiner

*Primary Examiner*—Michael J. Feely

(57) ABSTRACT

A method to reduce undesirable outgassing includes bonding at least two optical components with a bonding material and encapsulating the bonding material with a capping material. The capping material inhibits the outgassing of species that would otherwise be emitted from the bonding material to the surrounding. In one example, the bonding material is silicone and the capping material is epoxy.

36 Claims, 1 Drawing Sheet

PROCESS FOR THE REDUCTION OF UNDESIRABLE OUTGASSING SPECIES

FIELD OF INVENTION

This invention relates to mounting processes for optical components in an optical assembly.

DESCRIPTION OF RELATED ART

Mounting of optical components can be accomplished by various methods. See, e.g., "Opto-mechanical Systems Design" by Paul R. Yoder, Jr., Marcel Dekker, Inc. 1986. Of these methods, bonding of optical components can usually be done faster and cheaper than traditional mechanical clamping. Structural adhesives most frequently used are two-part epoxies, urethanes, and room-temperature-vulcanizing (RTV) elastomers such as silicone. Adhesives emit (i.e., outgas) volatile ingredients during curing or when exposed to vacuum or elevated temperatures. These emitted ingredients may then condense as contaminating films on nearby surfaces, such as optics, opto-mechanical assemblies, or items under process. See, e.g., "Design and Mounting of Prisms and Small Mirrors in Optical Instruments" by Paul R. Yoder, Jr., SPIE Optical Engineering Press, 1998.

Thus, what is needed is a method to reduce undesirable outgassing in optical assemblies.

SUMMARY OF THE INVENTION

In one embodiment of the invention, a method to reduce undesirable outgassing includes bonding at least two optical components with a bonding material and encapsulating the bonding material with a capping material. The capping material inhibits the outgassing of species that would otherwise be emitted from the bonding material to the surrounding. In one embodiment, the bonding material is silicone. In one embodiment, the capping material is epoxy.

DETAILED DESCRIPTION

Figure 1:
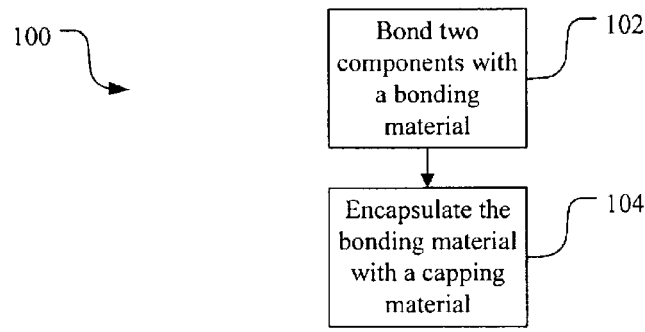
FIG. 1 illustrates a method to reduce undesirable outgassing species in one embodiment of the invention.

FIG. 1 illustrates a method 100 to reduce undesirable outgassing species from a bonding material in an optical assembly in one embodiment of the invention. The optical assembly is, for example, an interferometer used in a high precision positioning system.

Figure 2:
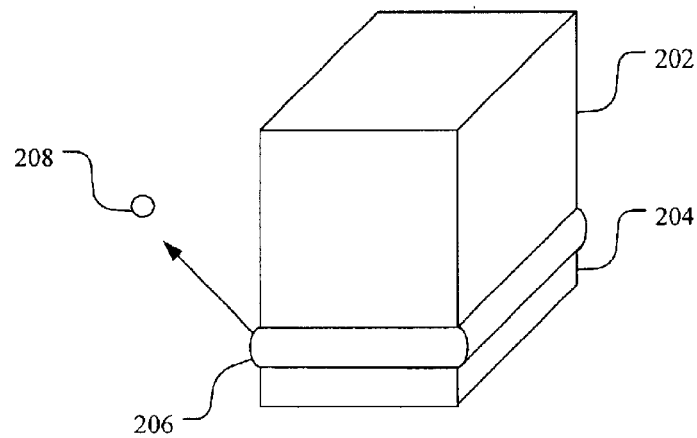
FIG. 2 illustrates the bonding of two optical components with a bonding material in one embodiment.

In action 102, an optical component 202 (FIG. 2) and a base 204 (FIG. 2) of the optical assembly are mounted together with a bonding material 206 (FIG. 2). Bonding material 206 can be any adhesive material that emits an undesirable level of an outgassing species 208 (FIG. 2). The outgassing species 208 can decompose and deposit on the surfaces of the optical assembly. Such deposits can degrade the optical performance of the optical assembly.

In one embodiment, bonding material 206 is silicone such as Dow Corning® 93-500 Space Grade Encapsulant. For silicone, the outgassing species 208 includes silicones, hydrocarbons, nitrogen, oxygen, and water. For other bonding materials, undesirable outgassing species can include amines, phthalates, epoxy monomers, and photo-polymerization initiators. In other embodiments, bonding material 206 can be a flexible epoxy, such as Cemedine EP001.

Figure 3:
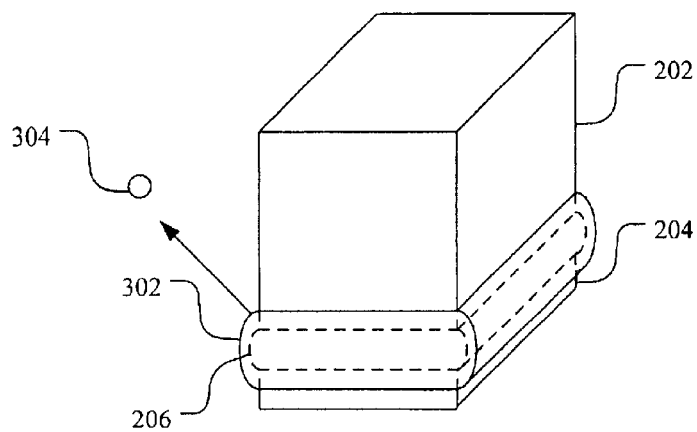
FIG. 3 illustrates the encapsulation of the bonding material with a capping material in one embodiment.

In action 104, the exposed periphery of bonding material 206 is encapsulated by a capping material 302 (FIG. 3). Capping material 302 can be any material that substantially inhibits the outgassing of species 208 to an acceptable level for a particular application. Capping material 302 may inhibit the outgassing of species 208 in various ways, including sealing or trapping of species 208. Capping material 302 may emit an acceptable level of outgassing species 304 (FIG. 3) that does not severely degrade the optical performance of the optical assembly.

In one embodiment, capping material 302 is epoxy such as Loctite® Hysol® 0151 or Hysol® EA9313. For epoxy, the outgassing species 304 includes amines, phthalates, epoxy monomers, and photo-polymerization initiators. The resin and the curing agent of the epoxy can be premixed and frozen to ensure consistency of the epoxy as described in U.S. patent application Ser. No. 09/603,107, filed on Jun. 22, 2000, which is incorporated by reference in its entirety. Alternatively, the resin and the curing agent of the epoxy can be mixed at room temperature during the mounting process. In other embodiments, capping material 302 can be polyurethane, metal, or a hydrocarbon polymer coating such as Parylene or Pyralin.

Various other adaptations and combinations of features of the embodiments disclosed are within the scope of the invention. Although optical assemblies are specifically mentioned, the above method can be applied to any assembly to reduce undesirable outgassing species. Numerous embodiments are encompassed by the following claims.

What is claimed is:

1. A method to reduce undesirable outgassing in an optical assembly, comprising:

bonding at least two optical components with a bonding material, wherein the bonding material is of a type that emits an outgassing species; and encapsulating an exposed periphery of the bonding material with a capping material that at least substantially inhibits the outgassing species, wherein the capping material is epoxy.

2. The method of claim 1, wherein the capping material at least substantially inhibits the outgassing species by at least substantially sealing or trapping the outgassing species.

3. The method of claim 1, wherein the bonding material is selected from the group consisting of silicone and flexible epoxy.

4. The method of claim 1, wherein the epoxy is premixed and frozen.

5. The method of claim 1, wherein the epoxy is mixed at room temperature.

6. An optical assembly comprising:

a first optical component;

a second optical component mounted to the first optical component;

a bonding material bonding the first and the second optical components, wherein the bonding material is of a type that emits an outgassing species; and a capping material encapsulating an exposed periphery of the bonding material that at least substantially inhibits the outgassing species, wherein the capping material is epoxy.

7. The optical assembly of claim 6, wherein the capping material at least substantially inhibits the outgassing species by at least substantially sealing or trapping the outgassing species.

8. The optical assembly of claim 6, wherein the bonding material is selected from the group consisting of silicone and flexible epoxy.

9. The optical assembly of claim 6, wherein the epoxy is premixed and frozen.

10. The optical assembly of claim 6, wherein the epoxy is mixed at room temperature.

11. A method to reduce undesirable outgassing in an optical assembly, comprising:
bonding at least two optical components with a bonding material, wherein the bonding material is of a type that emits an outgassing species; and
encapsulating an exposed periphery of the bonding material with a capping material that at least substantially inhibits the outgassing species, wherein the capping material is polyurethane.

12. The method of claim 11, wherein the capping material at least substantially inhibits the outgassing species by at least substantially sealing or trapping the outgassing species.

13. The method of claim 11, wherein the bonding material is selected from the group consisting of silicone and flexible epoxy.

14. An optical assembly comprising:
a first optical component;
a second optical component mounted to the first optical component;
a bonding material bonding the first and the second optical components, wherein the bonding material is of a type that emits an outgassing species; and
a capping material encapsulating an exposed periphery of the bonding material that at least substantially inhibits the outgassing species, wherein the capping material is polyurethane.

15. The system of claim 14, wherein the capping material at least substantially inhibits the outgassing species by at least substantially sealing or trapping the outgassing species.

16. The system of claim 14, wherein the bonding material is selected from the group consisting of silicone and flexible epoxy.

17. A method to reduce undesirable outgassing in an optical assembly, comprising:
bonding at least two optical components with a bonding material, wherein the bonding material is of a type that emits an outgassing species; and
encapsulating an exposed periphery of the bonding material with a capping material that at least substantially inhibits the outgassing species, wherein the capping material is a hydrocarbon polymer coating.

18. The method of claim 17, wherein the capping material at least substantially inhibits the outgassing species by at least substantially sealing or tapping the outgassing species.

19. The method of claim 17, wherein the bonding material is selected from the group consisting of silicone and flexible epoxy.

20. An optical assembly comprising:
a first optical component;
a second optical component mounted to the first optical component;
a bonding material bonding the first and the second optical components, wherein the bonding material is of a type that emits an outgassing species; and
a capping material encapsulating an exposed periphery of the bonding material that at least substantially inhibits the outgassing species, wherein the capping material is a hydrocarbon polymer coating.

21. The system of claim 20, wherein the capping material at least substantially inhibits the outgassing species by at least substantially sealing the outgassing species or trapping the outgassing species.

22. The system of claim 20, wherein the bonding material is selected from the group consisting of silicone and flexible epoxy.

23. A method to reduce undesirable outgassing in an optical assembly, comprising:
bonding at least two optical components with a bonding material, wherein the bonding material is of a type that emits an outgassing species; and
encapsulating an exposed periphery of the bonding material with a capping material that at least substantially inhibits the outgassing species, wherein the capping material is metal.

24. The method of claim 23, wherein the capping material at least substantially inhibits the outgassing species by at least substantially sealing or trapping the outgassing species.

25. The method of claim 23, wherein the bonding material is selected from the group consisting of silicone and flexible epoxy.

26. An optical assembly comprising:
a first optical component;
a second optical component mounted to the first optical component;
a bonding material bonding the first and the second optical components, wherein the bonding material is of a type that emits an outgassing species; and
a capping material encapsulating an exposed periphery of the bonding material that at least substantially inhibits the outgassing species, wherein the capping material is metal.

27. The system of claim 26, wherein the capping material at least substantially inhibits the outgassing species by at least substantially sealing the outgassing species or trapping the outgassing species.

28. The system of claim 26, wherein the bonding material is selected from the group consisting of silicone and flexible epoxy.

29. A method to reduce undesirable outgassing in an interferometer system, comprising:
bonding at least two optical components with a bonding material, wherein the bonding material is of a type that emits an outgassing species; and
encapsulating an exposed periphery of the bonding material with a capping material that at least substantially inhibits the outgassing species.

30. The method of claim 29, wherein the capping material is selected from the group consisting of epoxy, polyurethane, hydrocarbon polymer coating, and metal.

31. The method of claim 29, wherein the capping material at least substantially inhibits the outgassing species by at least substantially sealing or trapping the outgassing species.

32. The method of claim 29, wherein the bonding material is selected from the group consisting of silicone and flexible epoxy.

33. An interferometer system comprising:
a first optical component;
a second optical component mounted to the first optical component;
a bonding material bonding the first and the second optical components, wherein the bonding material is of a type that emits an outgassing species; and a capping material encapsulating an exposed periphery of the bonding material, wherein the capping material at least substantially inhibits the outgassing species.

34. The system of claim 33, wherein the capping material is selected from the group consisting of epoxy, polyurethane, hydrocarbon polymer coating, and metal.

35. The system of claim 33, wherein the capping material at least substantially inhibits the outgassing species by at least substantially sealing the outgassing species or trapping the outgassing species.

36. The system of claim 33, wherein the bonding material is selected from the group consisting of silicone and flexible epoxy.

* * * * *